United States Patent
Olofsson et al.

(10) Patent No.: US 7,380,383 B2
(45) Date of Patent: *Jun. 3, 2008

(54) GUIDING MEANS AT A JOINT

(75) Inventors: Ola Olofsson, Trelleborg (SE); Ulf Palmblad, Lund (SE); Leif Johansen, Oslo (NO)

(73) Assignee: Pergo (Europe) AB, Perstorp (SE)

( * ) Notice: Subject to any disclaimer, the term of this patent is extended or adjusted under 35 U.S.C. 154(b) by 545 days.

This patent is subject to a terminal disclaimer.

(21) Appl. No.: 10/754,564

(22) Filed: Jan. 12, 2004

(65) Prior Publication Data

US 2004/0141804 A1 Jul. 22, 2004

Related U.S. Application Data

(60) Division of application No. 09/661,627, filed on Sep. 13, 2000, now Pat. No. 6,682,254, which is a continuation-in-part of application No. 09/601,573, filed as application No. PCT/SE99/00128 on Feb. 1, 1999, now abandoned.

(30) Foreign Application Priority Data

Feb. 4, 1998 (SE) .................................... 9800311

(51) Int. Cl.
*E04B 2/00* (2006.01)
*B23Q 1/48* (2006.01)
(52) U.S. Cl. ..................... 52/582.1; 403/381
(58) Field of Classification Search ................ 403/375, 403/381; 52/582.1, 586.1, 591.1, 591.3, 52/591.4, 592.1, 592.2, 588.1
See application file for complete search history.

(56) References Cited

U.S. PATENT DOCUMENTS 752,694 A 2/1904 Lund (Continued)

FOREIGN PATENT DOCUMENTS

DE 3319235 11/1984

(Continued)

OTHER PUBLICATIONS

International Search Report.

*Primary Examiner*—Daniel P. Stodola
*Assistant Examiner*—Victor MacArthur
(74) *Attorney, Agent, or Firm*—Novak Druce & Quigg LLP

(57) ABSTRACT

A guiding element at a joint between boards, the joint including groove and tongue preferably intended to be joined by the use of glue. The tongue includes at least one guiding wedge. A fitting clearance between the tongue and the groove includes a first fitting clearance and a second, guiding, fitting clearance. The second, guiding, fitting clearance is obtained through the guiding wedges which are arranged parallel to the extension of the joint. The first fitting clearance comprises the main part of the fit and the second, guiding fitting clearance comprises a smaller part of the fit. The first fitting clearance is in the range 0.1-1 mm, while the second, guiding, fitting clearance is in the range 0.01-0.2 mm. The tongue of the joint is provided with at least one equalizing recess so that at least one equalizing cavity is formed in the joint, which equalizing cavity receives surplus glue used during the joining.

9 Claims, 2 Drawing Sheets

U.S. PATENT DOCUMENTS

| | | | |
|---|---|---|---|
| 2,004,193 A | 6/1935 | Cherry | |
| 2,238,169 A | 4/1941 | Heyn et al. | |
| 4,672,728 A | 6/1987 | Nimberger | |
| 4,920,626 A | 5/1990 | Nimberger | |
| 5,165,816 A | 11/1992 | Parasin | |
| 5,292,155 A | 3/1994 | Bell et al. | |
| 5,295,341 A | 3/1994 | Kajiwara | |
| 5,618,602 A * | 4/1997 | Nelson | 52/592.1 X |
| 5,706,621 A | 1/1998 | Pervan | |
| 5,797,237 A | 8/1998 | Finkell, Jr. | |
| 6,006,486 A | 12/1999 | Morian et al. | |
| 6,098,365 A | 8/2000 | Martin et al. | |
| 6,101,778 A * | 8/2000 | Martensson | 52/582.1 |
| 6,182,410 B1 | 2/2001 | Pervan | |
| 6,182,413 B1 | 2/2001 | Magnusson | |
| 6,247,285 B1 | 6/2001 | Moebus | |
| 6,397,547 B1 * | 6/2002 | Martensson | 52/582.1 |
| 6,418,683 B1 * | 7/2002 | Martensson et al. | 52/582.1 X |
| 6,421,970 B1 * | 7/2002 | Martensson et al. | 52/582.1 X |
| 6,505,452 B1 * | 1/2003 | Hannig et al. | 52/592.4 X |
| 6,588,166 B2 * | 7/2003 | Martensson et al. | 52/586.1 X |
| 6,606,834 B2 * | 8/2003 | Martensson et al. | |
| 6,682,254 B1 * | 1/2004 | Olofsson et al. | 403/375 |
| 2001/0034992 A1 | 11/2001 | Pletzer et al. | |
| 2003/0505017 | 1/2004 | Olofsson | |

FOREIGN PATENT DOCUMENTS

| | | |
|---|---|---|
| JP | 1178659 | 7/1989 |
| WO | 9426999 | 11/1994 |
| WO | 0733756 | 9/1996 |
| WO | 9627721 | 9/1996 |
| WO | 9747834 | 12/1997 |

* cited by examiner

GUIDING MEANS AT A JOINT

CROSS REFERENCE TO RELATED APPLICATIONS

This application is a divisional application of Ser. No. 09/661,627, filed Sep. 13, 2000 now U.S. Pat. No. 6,682,254, which is a continuation-in-part of application Ser. No. 09/601,573, filed Aug. 4, 2000 now abandoned; which is a 35 USC § 371 application of International Application PCT/SE99/00128, filed 1 Feb. 1999.

BACKGROUND OF THE INVENTION

1. Field of the Invention

Prefabricated floorboards which at their edges are provided with groove and tongue are well known nowadays. As these are very easy to install it is possible for the normal handy man to achieve this. These type of floors can be constituted of massive wood, fibre board or particle board. These are often provided with a surface layer, such as lacquer or some sort of laminate. The boards are most often installed by gluing them together via their groove and tongue. It is desired to join the separate boards so closely that the joint becomes practically invisible, which increases the moisture resistance radically. The usable life of the installed floor is hereby also increased. In order to achieve a tight joint, it is essential that glue is used excessively. The clearance in the joint will therefore have to be relatively large in order to be able to force the boards together without having to use special equipment due to the forces that would be needed otherwise. A small clearance will cause a hydraulic resistance caused by the glue captured inside the groove during the joining. The clearance needed will, therefore, cause a random discrepancy in the levels between adjacent floorboards. This discrepancy in levels will lead to an increased wear at the joint and that moisture may penetrate the joint. The decorative wear layer, often constituted by lacquer or laminate will hereby often be worn down closest to the joint. The wood fibre will, hereby, be naked closest to the joint, which, in addition to being unsightly, also may cause the fibres to swell when exposed to moisture. This causes the surface layer to rise closest to the edges whereby these edges will be exposed to further wear, which will decrease the useful life of the floor radically.

2. Description of the Related Art

It has, through the present invention, quite unexpectedly been possible to solve the above mentioned problems so that the risk for error during installation is radically reduced, whereby the average usable life of the floor, with a guiding means according to the present invention, is considerably increased. Accordingly, the invention relates to a guiding means at a joint between boards. The joint comprises groove and tongue preferably intended to be joined by means of glue. The tongue includes at least one guiding wedge whereby a fitting clearance between the tongue and the groove includes a first fitting clearance and a second, guiding, fitting clearance. The second, guiding fitting clearance is obtained through the guiding wedges which are arranged parallel to the extension of the joint, whereby the first fitting clearance comprises the main part of the fit and the second, guiding fitting clearance is in the range 0.1-1 mm, while the second, guiding fitting clearance is in the range 0.01-0.2 mm. The tongue of the joint is provided with at least one equalizing recess so that at least one equalizing cavity is formed in the joint, which equalizing cavity receives surplus glue used during the joining. The first fitting clearance is preferably in the range 0.1-0.5 mm, while the second, guiding fitting clearance is in the range 0.2-0.1 mm.

SUMMARY OF THE INVENTION

The present invention relates to a guiding means at a joint comprising groove and tongue, preferably intended to be joined with glue.

According to a preferred embodiment of the invention the equalising cavity is arranged at the upper side base of the tongue through a recess, the recess having an opening directed upwards and outwards whereby the surplus glue collected in the equalising cavity during assembly will have the function of a gasket in the joint. According to the same embodiment a considerable part of the hydraulic pressure, caused by the glue in the equalising cavity during assembly, will be directed upwards whereby the force, caused by the hydraulic pressure, urging the joint apart during the assembly is radically reduced.

The cross section area of the equalising cavity is preferably at least 50% of the difference in cross section area between the tongue and the groove.

The guiding wedges are according to one alternative embodiment provided with a number of narrow channels arranged perpendicular to the extension of the joint.

The distance between the channels preferably is less than 50 mm, most preferably less than 20 mm, while the width of the channels is at least 1 mm.

It is also advantageous to provide the tongue with a number of vents in the form of holes connecting the equalising cavity to the lower side of the tongue. The holes may alternatively connect the equalising cavity to the lower portions of the joint. According to yet another alternative the holes connects the equalising cavity to the lower side of the board.

The guiding means according to the embodiments of the invention forms a part of floor boards which together form a floor. The core of the boards is constituted by a material selected from the group, a fibre board, a particle board and that at least the upper side of the board is constituted by a decorative thermosetting laminate

BRIEF DESCRIPTION OF THE DRAWINGS

The invention is further illustrated together with enclosed figures showing different embodiments of the invention whereby.

DETAILED DESCRIPTION OF THE PREFERRED EMBODIMENTS

Figure 1:
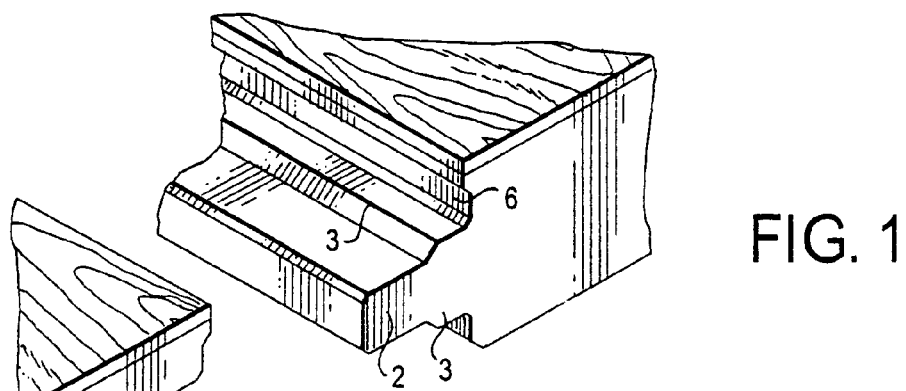
FIG. 1 shows, in perspective view, a first embodiment of a guiding means at a joint, according to the invention.
Figure 7:
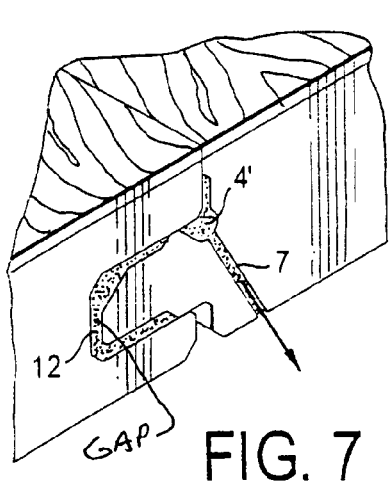
FIG. 7 shows, in perspective view, an alternative embodiment of a guiding means at a joint, as shown in FIG. 6.

Accordingly, FIG. 1 shows, in perspective view seen from above, a first embodiment of a guiding means at a joint according to the invention. The guiding means comprises groove 1 having a proximal portion 4'' and tongue 2 having a distal portion 16 which is intended to be joined by using glue 12 (FIG. 7). The tongue 2 comprises guiding wedges 3 on the upper and lower sides. The fitting clearance between the groove 1 and tongue 2 includes a first and a second, guiding, fitting clearance, which second, guiding, fitting clearance is obtained by the guiding wedges 3. The first fitting clearance forms the main part of the fit while the second, guiding, fitting clearance forms a smaller part of the fit. The first fitting clearance is approximately 0.2 mm while the second, guiding fitting clearance is approximately 0.05 mm. The guiding wedges 3 are arranged parallel to the extension of the joint. The same embodiment is shown assembled in FIG. 2. The respective surfaces of the joint are provided with recesses 6 so that first and second equalizing cavities 4', 4 (FIG. 4) are formed in the joint. The equalizing cavities 4, 4' are intended to receive the glue used at the assembly. The guiding means comprises a part of boards intended to, together form a floor whereby the core of the board is constituted by fibre board or a particle board and at least the upperside of the board is constituted by a decorative thermosetting laminate.

Figure 2:
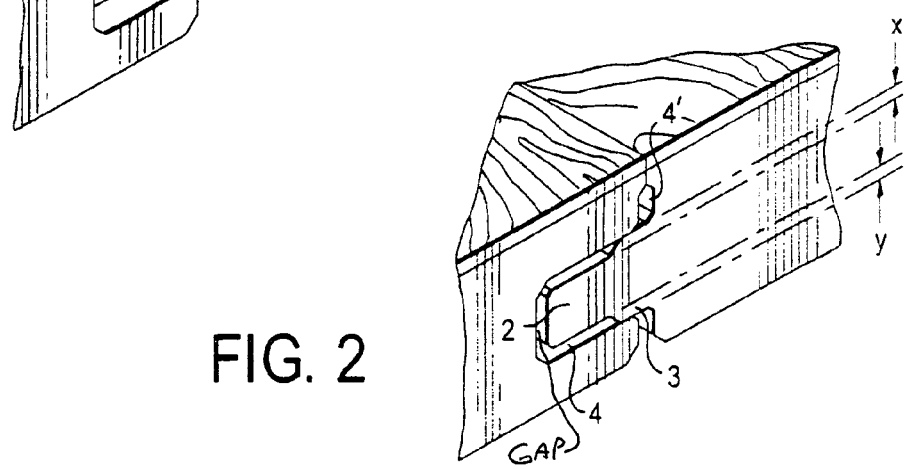
FIG. 2 shows, in perspective view, the embodiment form FIG. 1 after assembly.

Also as shown in FIG. 2 (as well as FIGS. 4 and 6-8), as the distal end of tongue 2 does not contact the proximal end of groove 1, a gap is formed between the proximal end of the groove and the distal end of the tongue.

Figure 3:
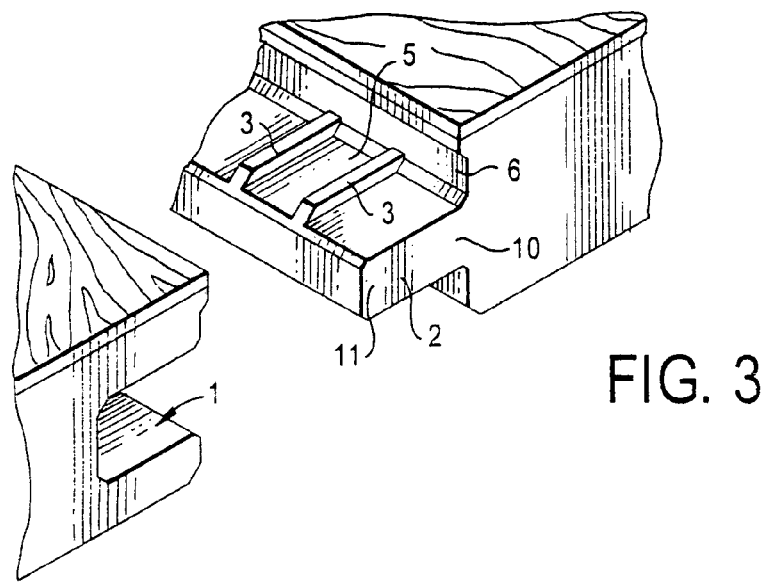
FIG. 3 shows, in perspective view, a second embodiment of a guiding means at a joint, according to the invention.

FIG. 3 shows, in perspective view seen aslant from above, a second embodiment of a guiding means at a joint, according to the invention. The embodiment conforms in the main with the one described in connection to FIGS. 1 and 2. The guiding wedges 3 are however, provided with narrow channels 5 arranged perpendicularly to the extension of the joint. The narrow channels 5, will allow the glue to flow from the groove 1, where the glue normally is applied, to the equalizing cavity 4'.

Figure 4:
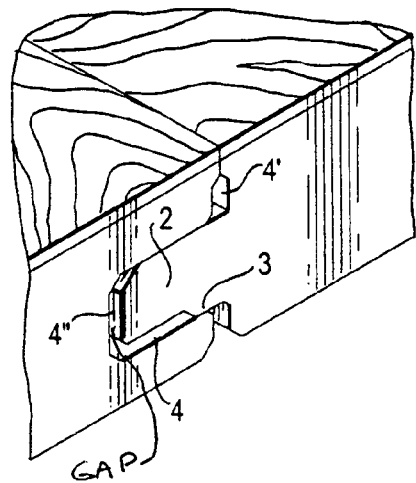
FIG. 4 shows, in perspective view, a third embodiment of a guiding means at a joint, according to the invention.

FIG. 4 shows, in perspective view seen aslant from above, a third embodiment of a guiding means at a joint, according to the invention. The embodiment is shown assembled. The embodiment corresponds in the main to the one described in connection to FIGS. 1 and 2, the tongue 2 is however provided with guiding wedges 3 only on the lower side.

Figure 5:
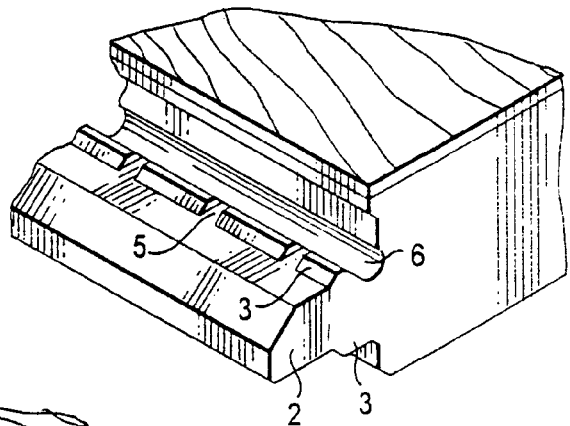
FIG. 5 shows, in perspective view, a fourth embodiment of a guiding means at a joint, according to the invention.

FIG. 5 shows, in perspective view seen aslant from above, a fourth embodiment of a guiding means at a joint, according to the invention. The embodiment corresponds to the main to the one described in connection to FIGS. 1, 2 and 3, the base or proximal portion 10 of the tongue 2 is however provided with a recess 6 having an opening directed upwards and outwards whereby the surplus glue collected in the main cavity during assembly will have the function of a gasket in the joint.

Figure 6:
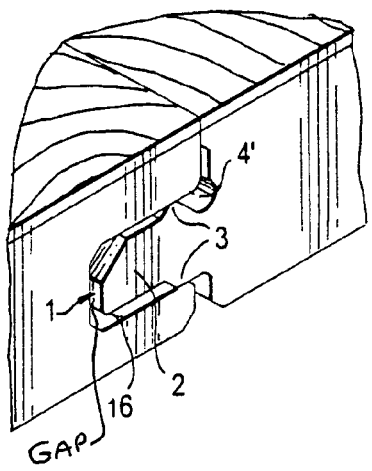
FIG. 6 shows, in perspective view, a preferred embodiment of a guiding means at a joint, according to the invention.

FIG. 6 shows, in perspective view seen aslant from above, a preferred embodiment of a guiding means at a joint, according to the invention. The embodiment is shown assembled. The embodiment corresponds in the main to the one described in connection to FIGS. 1 and 2, the base of the tongue 2 is however provided with a recess 6 having an opening directed upwards and outwards whereby the surplus glue collected in the equalizing cavity 4'' during assembly will have the function of a gasket in the joint. The recess 6 will further provide a considerable reduction of the hydraulic pressure, caused by the glue in the equalizing cavity 4 during assembly, as it will be directed upwards. The force, caused by the hydraulic pressure, will normally urge the joint apart during the assembly, before the glue has set.

Figure 8:
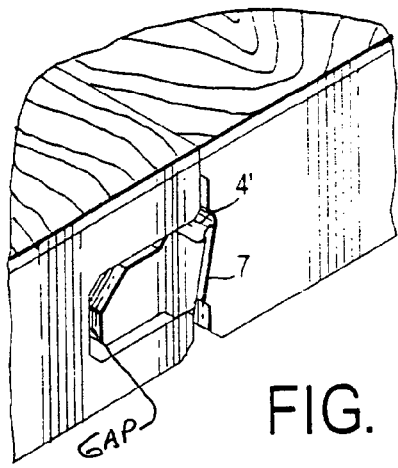
FIG. 8 shows, in perspective view, an alternative embodiment of a guiding means at a joint, as shown in FIG. 6.

FIGS. 7 and 8 show, in perspective view seen aslant from above, an alternative embodiment of a guiding means at a joint, according to the invention. FIGS. 7 and 8 corresponds in the one described in connection to FIG. 6. The equalizing cavity 4' is, however, provided with vents 7 in the form of holes. The vents 7 will slowly release the hydraulic pressure of the glue 12 in the direction of the arrow from the equalizing cavity 4'' during assembly. The slow pressure release will allow the glue to be forced into the narrow upper part of the equalizing cavity 4'' at the initial stage of the joining. The glue can be applied in the groove 1, the equalizing cavity 4'' or both.

The invention is not limited by the embodiments shown since these can varied in different ways within the scope of the invention. Guiding wedges 3 can, for example, be arranged inside the groove 1. If these guiding wedges 3 are parallel to the extension of the joint, they are suitably arranged in the bottom of the groove 1 while they can be given a shape similar to the one shown in FIG. 3 if they are arranged perpendicularly to extension of the joint.

The invention claimed is:

1. A joint formed at a junction between adjacent boards, the joint comprising:
   a first board, comprising an upper surface, a lower surface and a groove;
   a second board joined to the first board, and comprising an upper surface, a lower surface and a tongue, said upper surface of said first board and said upper surface of said second board abutting each other;
   a first equalizing cavity located adjacent to an upper end of a proximal end of the tongue below said abutting surfaces;
   wherein a distal end of the tongue is smaller than a proximal end of the groove;
   a second equalizing cavity, formed by a gap between the proximal end of the groove and the distal end of the tongue; and
   further comprising glue disposed in at least one of the first equalizing cavity and the second equalizing cavity.

2. A joint formed at a junction between adjacent boards, the joint comprising:
   a first board, comprising an upper surface, a lower surface and a groove;
   a second board joined to the first board, and comprising an upper surface, a lower surface and a tongue, said upper surface of said first board and said upper surface of said second board abutting each other;
   a first equalizing cavity located adjacent to an upper end of a proximal end of the tongue below said abutting surfaces;
   wherein a distal end of the tongue is smaller than a proximal end of the groove;
   a second equalizing cavity, formed by a gap between the proximal end of the groove and the distal end of the tongue, wherein at least one of the first equalizing cavity and the second equalizing cavity extends to the lower surface of the second board.

3. A joint formed at a junction between adjacent boards, the joint comprising:
   a first board, comprising an upper surface, a lower surface and a groove;
   a second board joined to the first board, and comprising an upper surface, a lower surface and a tongue, said upper surface of said first board and said upper surface of said second board abutting each other;

a first equalizing cavity located adjacent to an upper end of a proximal end of the tongue below said abutting surfaces;

wherein a distal end of the tongue is smaller than a proximal end of the groove;

a second equalizing cavity, formed by a gap between the proximal end of the groove and the distal end of the tongue, wherein the tongue comprises at least one guiding wedge on an upper surface or a lower surface thereof, whereby the at least one guiding wedge contacts an inner surface of the groove.

4. A joint formed at a junction between adjacent boards, the joint comprising:

a first board, comprising an upper surface, a lower surface and a groove;

a second board joined to the first board, and comprising an upper surface, a lower surface, and a tongue, said upper surface of said first board and said upper surface of said second board abutting each other; and said first board and said second board defining a gap therebetween; and a hole, in fluid communication with said gap, said hole having an opening below said groove.

5. The joint of claim 4, wherein said hole extends from said joint towards a proximal section of said first or second boards.

6. The joint of claim 4, wherein said hole extends towards said lower surface of said first or second board.

7. The joint of claim 4, wherein said hole is a vent through one of said boards.

8. The joint of claim 7, wherein said vent has a terminal end at said lower surface of said board.

9. A method for assembling floor boards to form a joint therebetween, the method comprising:

providing:
  a first board, said first board comprising an upper surface, a lower surface and a groove;
  a second board joined to the first board, and comprising an upper surface, a lower surface, and a tongue; and
  glue, disposed on at least one of said tongue and said groove;

mating said groove of said first board with said tongue of said second board; and directing said glue away from said upper surface and towards the lower surface of said boards.

* * * * *